US011126168B2

(12) United States Patent
Nagabhairava et al.

(10) Patent No.: US 11,126,168 B2
(45) Date of Patent: Sep. 21, 2021

(54) AUTOMATIC DISCOVERY AND PERSISTENCE OF DATA FOR INDUSTRIAL AUTOMATION EQUIPMENT

(71) Applicant: Rockwell Automation Technologies, Inc., Mayfield Heights, OH (US)

(72) Inventors: Mithun Mohan Nagabhairava, Waukegan, IL (US); Andrew J. Schaeffler, Whitefish Bay, WI (US); David C. Mazur, Mequon, WI (US); Rob Alan Entzminger, Lenexa, KS (US); Peter A. Morell, Royalton, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 267 days.

(21) Appl. No.: 16/503,166

(22) Filed: Jul. 3, 2019

(65) Prior Publication Data
US 2021/0003996 A1   Jan. 7, 2021

(51) Int. Cl.
G05B 19/418 (2006.01)
G06F 16/903 (2019.01)
H04L 29/08 (2006.01)

(52) U.S. Cl.
CPC ..... *G05B 19/4185* (2013.01); *G05B 19/4183* (2013.01); *G06F 16/903* (2019.01); *H04L 67/303* (2013.01)

(58) Field of Classification Search
CPC ............ G05B 19/4185; G05B 19/4183; G06F 16/903; H04L 67/303; H04L 67/16; H04L 67/12; Y02P 80/40
See application file for complete search history.

(56) References Cited

U.S. PATENT DOCUMENTS

| | | | | |
|---|---|---|---|---|
| 7,813,822 B1* | 10/2010 | Hoffberg | .......... | H04N 21/44222 700/94 |
| 2014/0336795 A1* | 11/2014 | Asenjo | .............. | G05B 19/4083 700/86 |
| 2014/0337429 A1* | 11/2014 | Asenjo | .............. | G06Q 10/0637 709/204 |
| 2016/0196132 A1* | 7/2016 | Searle | ................. | H04L 41/082 717/173 |
| 2016/0294614 A1* | 10/2016 | Searle | .................... | H04L 67/34 |
| 2018/0089870 A1* | 3/2018 | Billi-Duran | ............ | G06T 11/60 |

* cited by examiner

Primary Examiner — Ziaul Karim

(57) ABSTRACT

Techniques to facilitate automatic discovery of industrial assets and associated data in an industrial automation environment are disclosed herein. In at least one implementation, a computing system iteratively scans a communication network to automatically detect at least one industrial device on the communication network. The computing system determines a unique identifier of a device type associated with the at least one industrial device detected on the communication network. The computing system determines an identity object for the industrial device and maps the identity object to the unique identifier of the device type associated with the industrial device. Based on the identity object for the industrial device, the computing system establishes communication with the industrial device on the communication network and receives operational data from the industrial device. The computing system processes the operational data received from the industrial device to generate a device profile for the industrial device.

17 Claims, 6 Drawing Sheets

AUTOMATIC DISCOVERY AND PERSISTENCE OF DATA FOR INDUSTRIAL AUTOMATION EQUIPMENT

TECHNICAL FIELD

Aspects of the disclosure are related to computing hardware and software technology.

TECHNICAL BACKGROUND

Various manufacturing processes and other industrial operations occur in industrial automation environments. Some examples of industrial automation environments include industrial mining operations, automobile manufacturing factories, food processing plants, oil drilling operations, microprocessor fabrication facilities, and other types of industrial enterprises. Industrial automation environments typically involve many complex systems and processes which are often spread out over various disparate locations. For example, in industrial mining operations, drilling and excavation may occur at several different mining sites to extract ore from the earth, which may then be transported to remote mineral processing plants for further processing to recover desired minerals. Several mechanical and chemical techniques may be employed to aid in the recovery of the target minerals.

Industrial automation environments utilize various machines during the industrial manufacturing process, such as drives, pumps, motors, compressors, valves, robots, and other mechanical devices. These devices have various moving parts and other components that are driven by instructions received from industrial controller systems. Machine builders, solution providers, and other content creators typically produce the control logic needed to run on these industrial controller systems in order to control the mechanical functions of the devices and carry out their intended functions.

Industrial environments also commonly include a human-machine interface (HMI). An HMI typically receives and processes the status data from the machines to generate various graphical displays, which may indicate the current and historical performance of the machines. In traditional implementations, the HMI may also provide a mechanism for an operator to send control instructions to a control system that controls the machines. For example, an operator might use the HMI to direct the control system to update drive parameters, turn on a pump, speed-up a motor, or stop a robot.

OVERVIEW

Techniques to facilitate automatic discovery of industrial assets and associated data in an industrial automation environment are disclosed herein. In at least one implementation, a computing system iteratively scans a communication network to automatically detect at least one industrial device on the communication network. The computing system determines a unique identifier of a device type associated with the at least one industrial device detected on the communication network. The computing system determines an identity object for the at least one industrial device and maps the identity object to the unique identifier of the device type associated with the at least one industrial device. Based on the identity object for the at least one industrial device, the computing system establishes communication with the at least one industrial device on the communication network and receives operational data from the at least one industrial device. The computing system processes the operational data received from the at least one industrial device to generate a device profile for the at least one industrial device.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
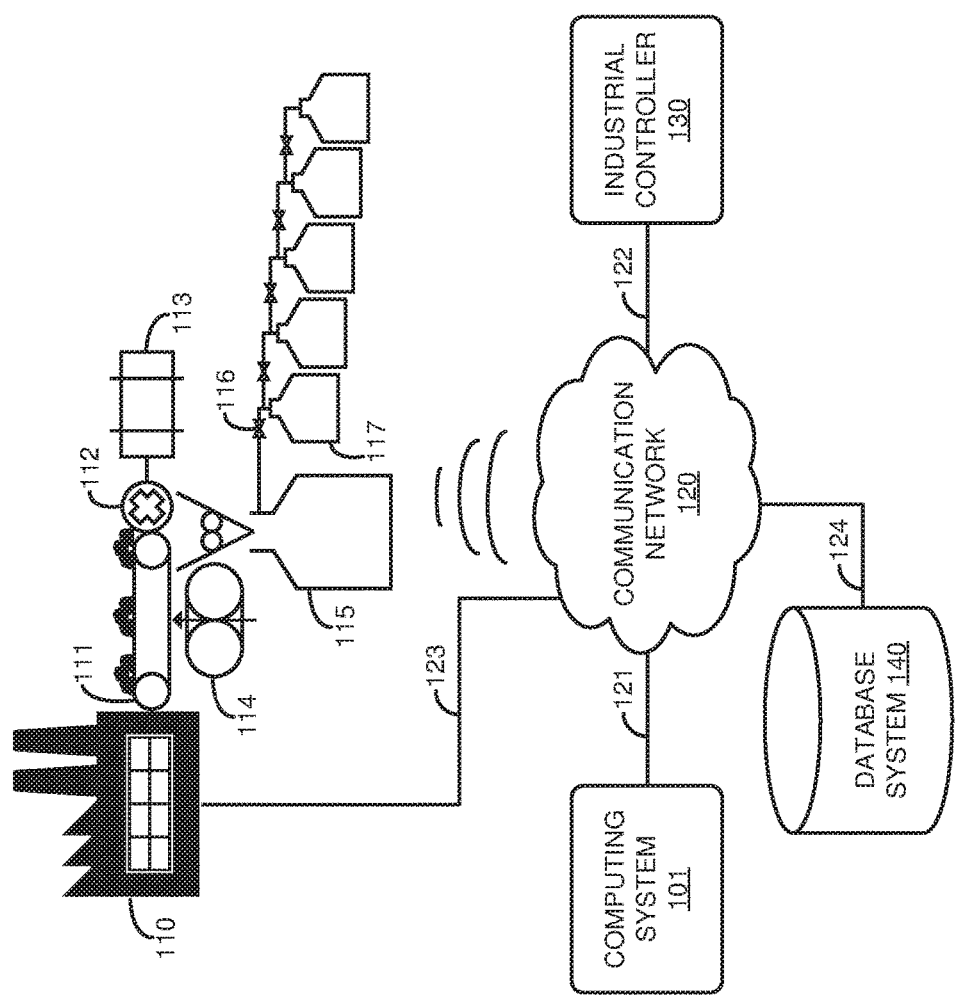
FIG. 1 is a block diagram that illustrates an industrial automation mining environment in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Industrial automation processes commonly utilize machines, electrical devices, and other equipment to perform various operations, such as controllers, drives, motors, bearings, compressors, impellers, valves, sensors, transmitters, and other industrial devices. Many of these devices typically have several moving parts and other components that are driven by instructions received from industrial controllers. For example, control logic program code could be processed by an industrial controller in order to transmit control signals that update drive parameters, turn on a pump, speed-up a motor, extend a robotic arm, or perform some other action.

Most industrial automation equipment and devices are connected over communication networks and communicate using communication protocols. For example, the control signals that direct the operation of various machines and other devices are commonly transmitted by an industrial controller to the machines and devices over a communication network using a communication protocol. The machines and other devices may also provide operational status data and other information back to the industrial controller or an HMI system over the communication network in the communication protocol. However, there are many different communication protocols supported by industrial devices employed in industrial automation environments, and many devices do not support the same protocols. For example, an industrial automation device produced by a certain manufacturer or vendor may communicate using a standard communication protocol, while another industrial device produced by a different vendor may communicate using an entirely different, proprietary communication protocol.

To perform industrial automation processes, most industrial automation environments commonly utilize machines, controllers, and other devices provided by various different manufacturers and vendors, which may communicate using several different protocols. For example, in order to meet the requirements of a particular industrial process, original equipment manufacturers (OEMs) and machine builders who specialize in designing and packaging equipment may utilize industrial devices from multiple different vendors when building an electromechanical system. Unfortunately, in order to communicate with these industrial devices and provide application-specific information and analytics on the data, most systems are limited to only working with the devices provided by a particular vendor, and are unaware of even the existence of additional devices provided by other third party vendors, let alone capable of communicating with them and exchanging data. The present disclosure provides a solution to this problem by introducing a methodology to automatically discover industrial devices, standardize data models, and contextualize data to provide out-of-the-box, application-specific functionality for industrial automation systems that involve multiple different vendor devices in an industrial automation environment.

The techniques disclosed herein may be utilized to automatically discover industrial assets and retrieve associated data in an industrial automation environment. In at least one implementation, the system searches a communication network using network parameters, such as internet protocol (IP) addresses, and systematically iterates and identifies industrial devices automatically that are connected to the communication network and are part of the industrial automation environment. For each piece of equipment discovered, a unique identifier is determined and assigned to identify the type of device, such as a vendor and model of the equipment. The system also determines an identity object for every auto-discovered industrial device, which is then mapped to the associated equipment type indicated by the unique identifiers to create equipment hierarchies and relationships, which may be further mapped to respective industrial applications, such as controllers, drives, motors, conveyors, compressors, pumps, sensors, transmitters, and any other applications. Based on the identity object for an industrial device, communication may be established with the device over the communication network in order to receive operational status data and other information from the device. For example, the data access could be standardized by interfacing with native or proxy data objects to standardize naming conventions and access for data tags and other parameters to provide standard integration across multiple different vendors. The system can then query the data objects and construct device profiles for every discovered device, which may then be utilized for diagnostics and analytics using real-time data from these devices. The device profiles would then be persisted within relational databases using the unique identifiers of the respective equipment and industrial application. To provide further intelligence, the device profiles may be matched with related contextual data from other available data sources within the system, such as relational databases, historians, application programming interfaces (APIs), power data from intelligent electronic devices (IEDs) and smart meters, and any other contextual data sources. Additionally, by utilizing standard electrical, mechanical, and ideal system characteristic curves depending on the application, the system can then automatically generate predefined key performance indicators (KPIs), faceplates, reports, real-time trends, diagnostics, maintenance events and service interval recommendations, and other data analytics to provide out-of-the-box functionality for any devices discovered on the network.

Figure 2:
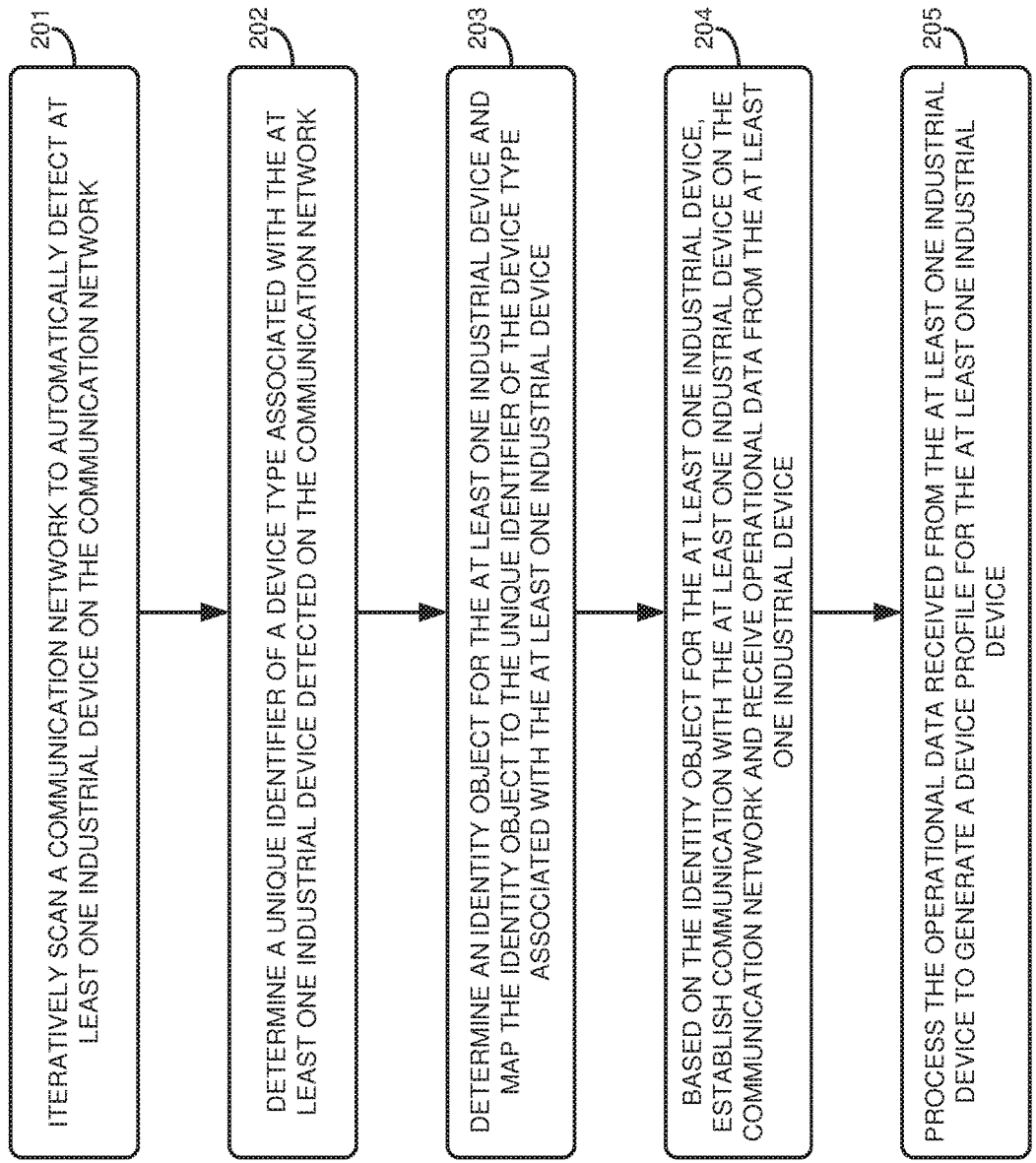
FIG. 2 is a flow diagram that illustrates an operation of a computing system in an exemplary implementation.
Figure 3:
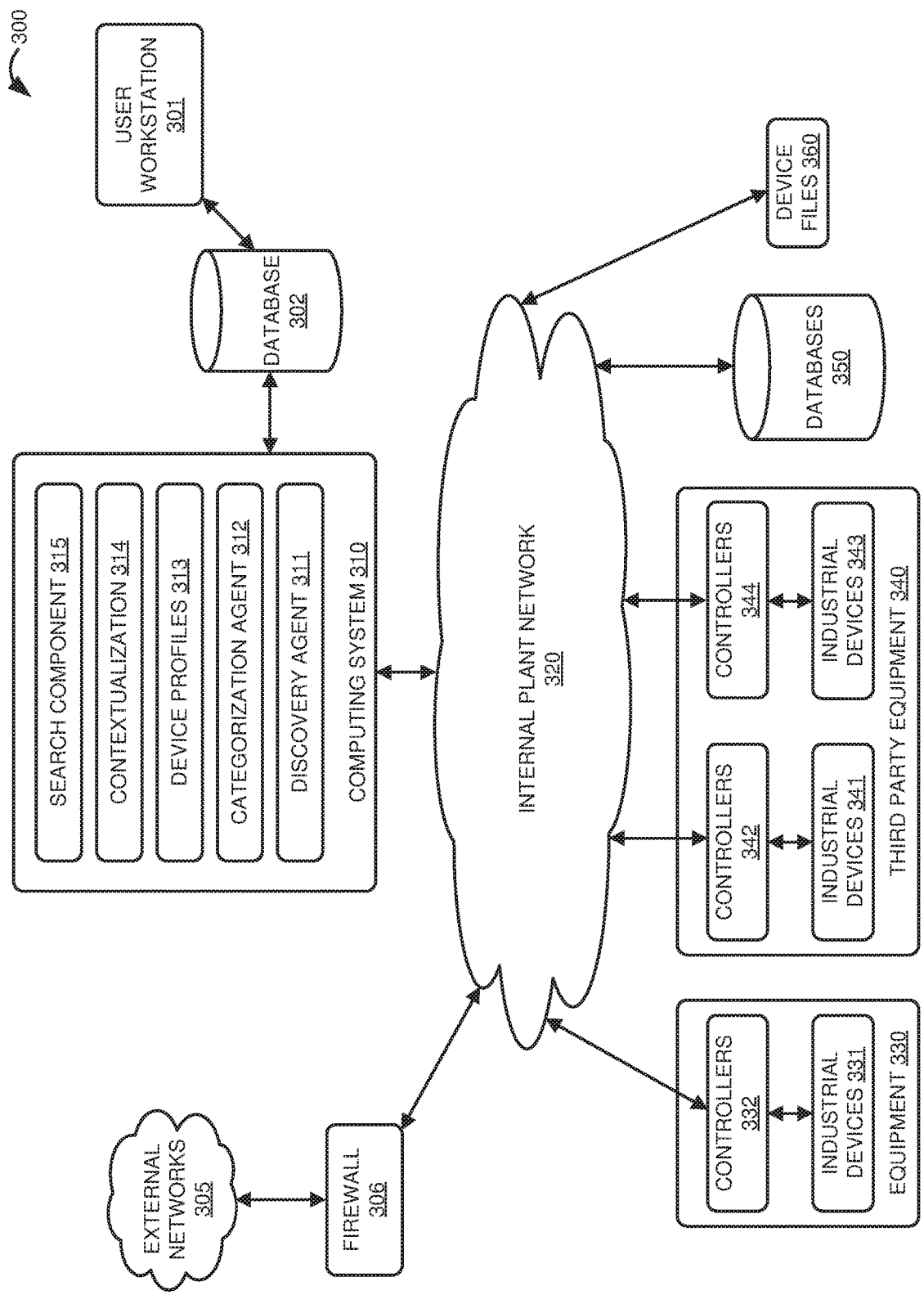
FIG. 3 is a block diagram that illustrates an industrial automation environment in an exemplary implementation.
Figure 4:
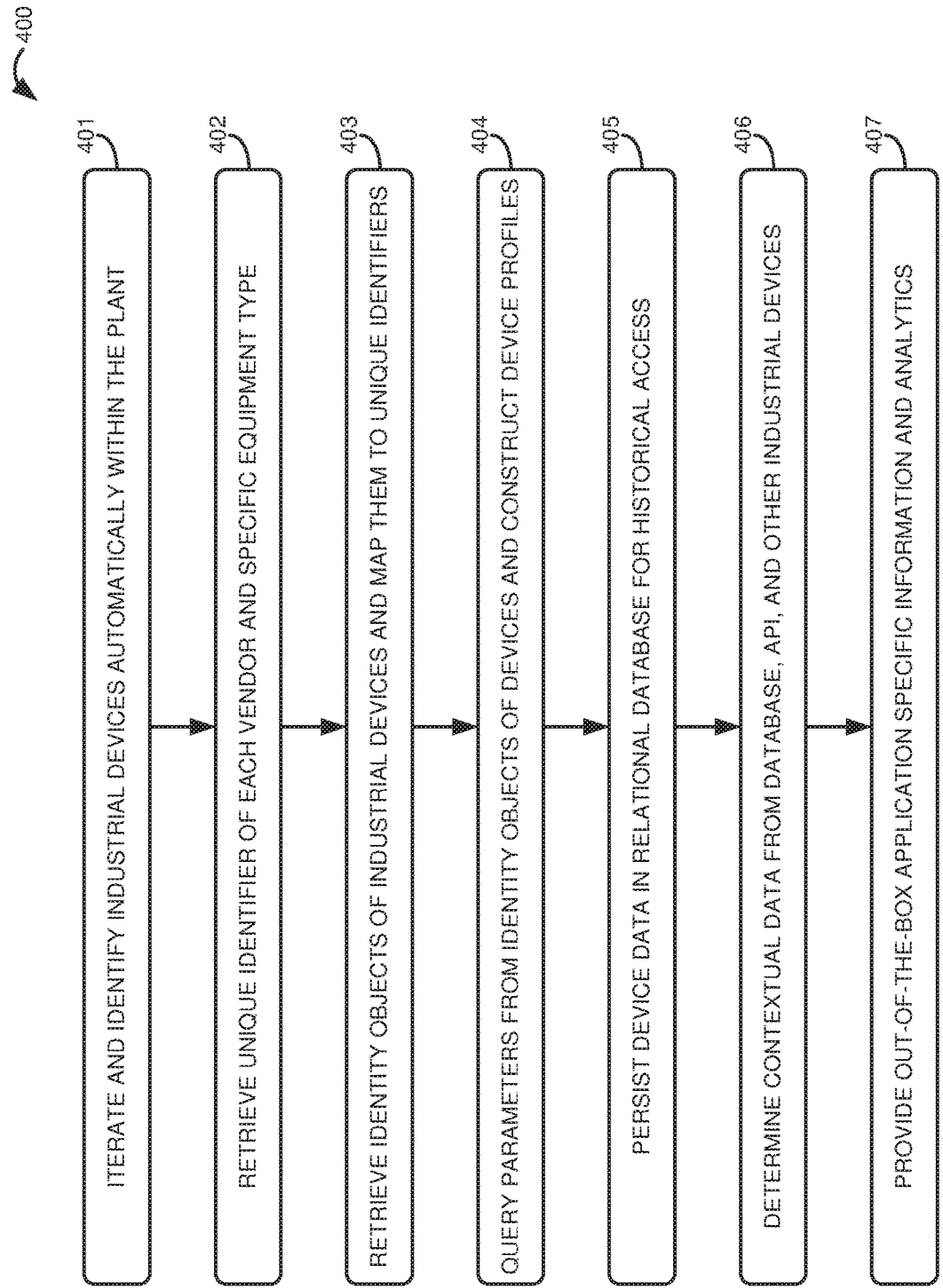
FIG. 4 is a flow diagram that illustrates an operation of a computing system in an exemplary implementation.
Figure 5:
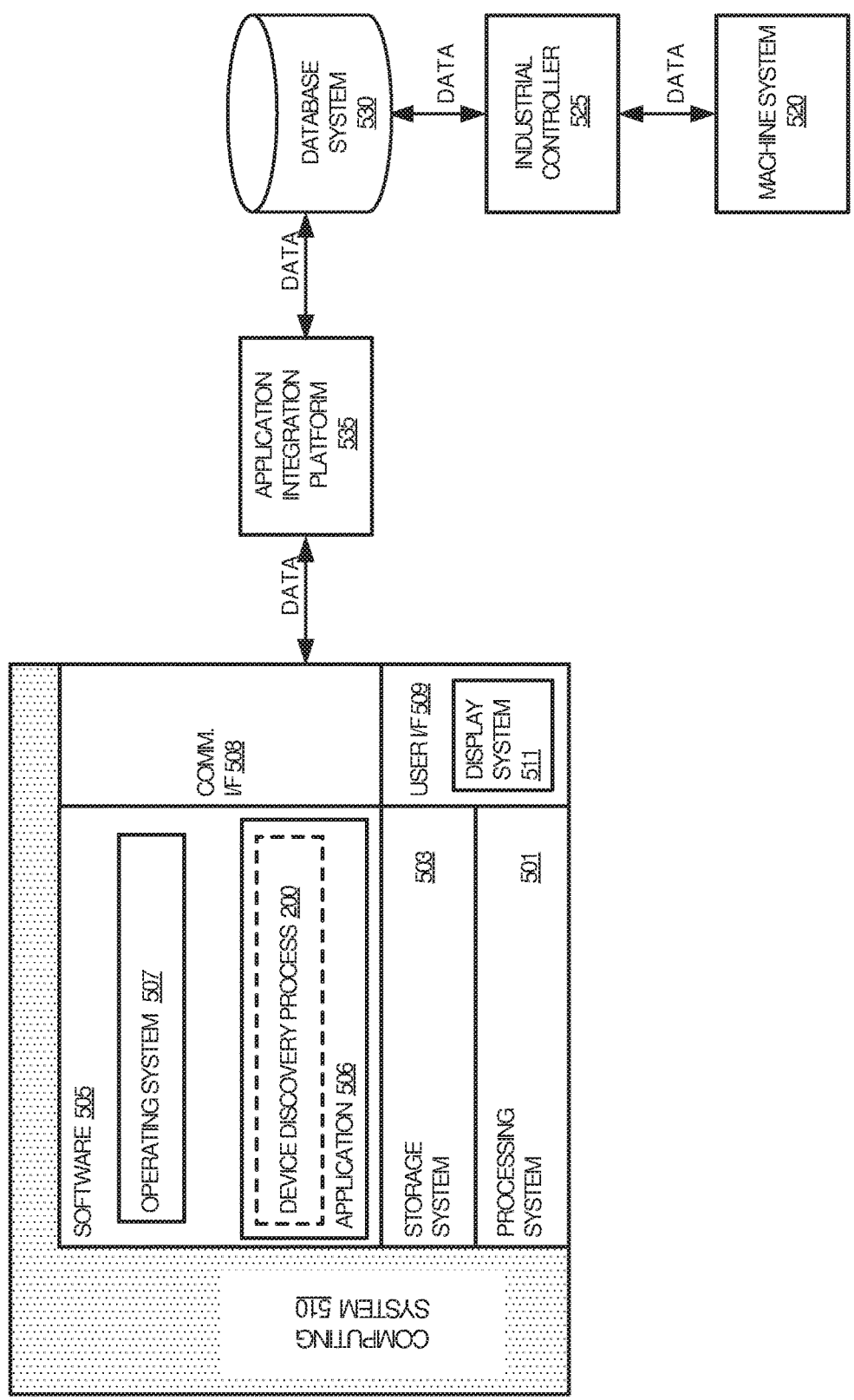
FIG. 5 is a block diagram that illustrates an operational scenario involving a computing system in an industrial automation environment in an exemplary implementation.
Figure 6:
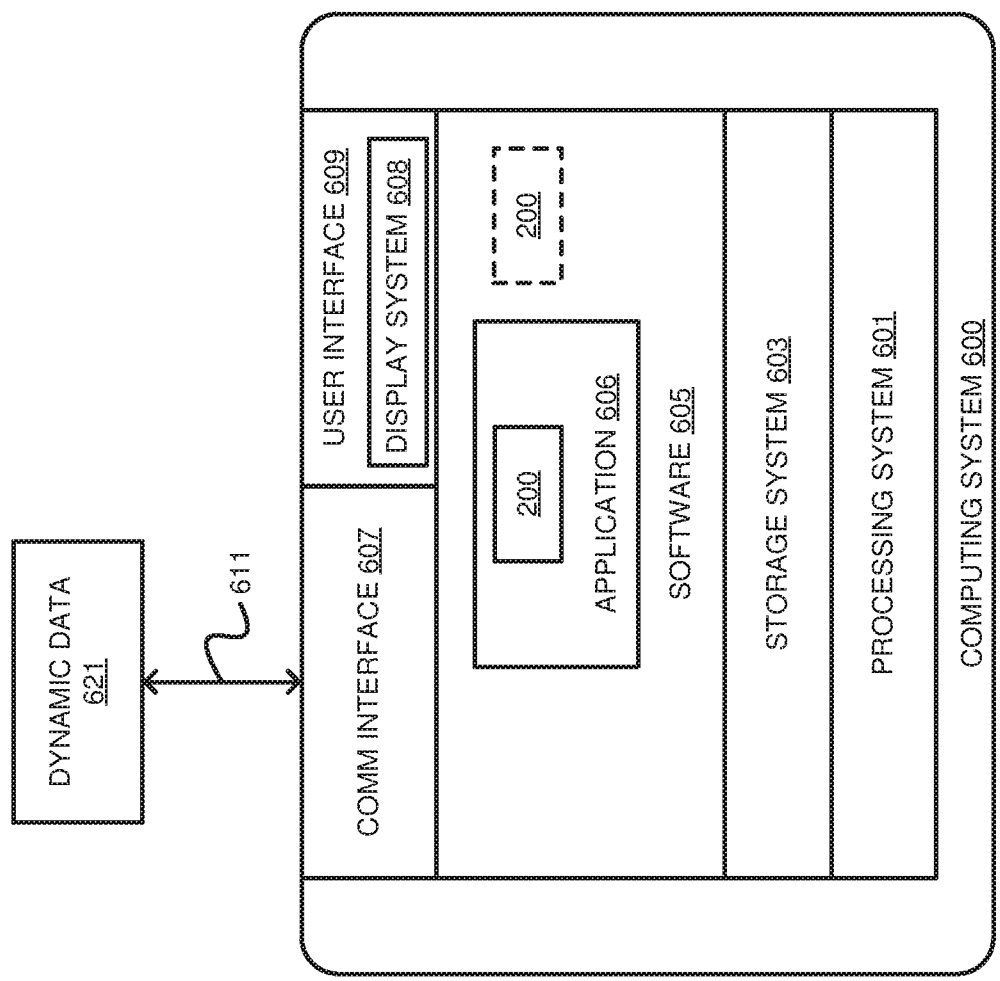
FIG. 6 is a block diagram that illustrates a computing system in an exemplary implementation.

Referring now to the drawings, FIG. 1 illustrates an exemplary industrial automation mining environment in which industrial assets and associated data may be automatically discovered. FIG. 2 is a flow diagram that illustrates an exemplary operation of a computing system to facilitate automatic discovery of industrial assets and associated data in an industrial automation environment. FIG. 3 illustrates an exemplary industrial automation environment, and FIG. 4 provides an exemplary operation of a computing system to automatically discover devices in the industrial automation environment and retrieve operational data. FIG. 5 illustrates an exemplary industrial automation environment that includes a computing system that may be used to execute a device discovery process, and FIG. 6 illustrates an exemplary computing system that may be used to perform any of the device discovery processes and operational scenarios described herein.

Turning now to FIG. 1, industrial automation mining environment 100 is illustrated in an exemplary embodiment. Industrial automation mining environment 100 provides an example of an industrial automation environment that may utilize any of the techniques disclosed herein, but note that the present disclosure could equally apply to any other industrial application. In this example, industrial automation mining environment 100 comprises mineral processing facility 110 which is representative of a concentrator plant that employs froth flotation techniques to improve mineral concentrations recovered from extracted ore. Processing facility 110 includes conveyor belt 111, crusher 112, motor 113, compressor 114, surge tank 115, valves 116, and flotation cells 117.

In this example, industrial automation mining environment 100 also includes computing system 101, communication network 120, industrial controller 130, and database system 140. Computing system 101 and communication network 120 communicate over communication link 121, communication network 120 and industrial controller 130 are in communication over communication link 122, and database system 140 and communication network 120 communicate over communication link 124. Processing facility 110 is connected to communication network 120 over communication link 123. Any of the industrial assets 111-117 of processing facility 110 may communicate with communication network 120 over communication link 123, which could comprise wired links and/or wireless links, including cellular links, or any other communication links. In some examples, communication network 120 could comprise an on-premise private network or private cloud accessible over a local network connection, a public cloud-based environment accessible over a wide area network such as the Internet, a direct connection such as a bus or serial link, or any other data communication technique, including combinations thereof. The techniques described below with respect to FIG. 1 could be executed by the systems of industrial automation mining environment 100 such as computing system 101 and industrial controller 130, and could be combined with operation 200 of FIG. 2 in some implementations.

In operation, ore is extracted off-site at drilling and excavation sites and delivered to processing facility 110 at a disparate location for flotation cell processing. The extracted ore is transported on conveyor belts 111 and ground into fine particles using crusher 112 operated by motor 113 so that the material is reduced to physically separate grains. This particulate matter is then mixed with water to form a slurry and contained within surge tank 115. The desired mineral is rendered hydrophobic by the addition of a surfactant or collector chemical reagent. The resulting pulp is then introduced to flotation cells 117 by opening valves 116 which is then injected with air or nitrogen from compressor 114 and agitated to form bubbles. The hydrophobic particles containing the desired mineral then attach to the bubbles which rise to the top and collect on the surface as a froth. The froth is then removed from the cell, producing a concentrate of the desired mineral.

In order to carry out the above operations, industrial controller 130 executes control logic code to dispatch control instructions over communication network 120 to control the operation of various industrial equipment, such as industrial assets 111-117. However, in this example, some of the devices and equipment utilized in industrial automation mining environment 100 may be unknown to industrial controller 130 and computing system 101, such as some of the valves 116, which may be provided by different manufacturers. Additional equipment and devices not shown in FIG. 1 could also be unknown to computing system 101 and industrial controller 130, such as other controllers, drives, motors, pumps, sensors, transmitters, and other industrial devices provided by third party vendors. However, computing system 101 can be employed to scan for and automatically discover these unknown devices on communication network 120, and determine unique identifiers and identity objects for the discovered devices. Using the identity objects, communication between computing system 101 and the discovered devices can then be established, thereby enabling computing system 101 to query parameters and other operational data from the devices. The data received from the devices can then be compiled into unique device profiles for each of the devices, which can be stored in database system 140 and accessed for diagnostics, analytics, and other data reporting. An exemplary operation to facilitate automatic discovery of industrial assets and associated data in an industrial automation environment will now be described in greater detail with respect to FIG. 2.

FIG. 2 is a flow diagram that illustrates an operation 200 of a computing system in an exemplary implementation. The operation 200 shown in FIG. 2 may also be referred to as device discovery process 200 herein. The steps of the operation are indicated below parenthetically. The following discussion of operation 200 will proceed with reference to computing system 101, communication network 120, and other elements of FIG. 1 in order to illustrate its operations, but note that the details provided in FIG. 1 are merely exemplary and not intended to limit the scope of process 200 to the specific implementation shown in FIG. 1.

Operation 200 may be employed to operate computing system 101 to facilitate automatic discovery of industrial assets and associated data in an industrial automation environment. As shown in the operational flow of process 200, computing system 101 iteratively scans communication network 120 to automatically detect at least one industrial device on communication network 120 (201). Some examples of industrial devices that may be automatically detected on communication network 120 include industrial controllers, HMI systems, drives, motors, compressors, pumps, sensors, transmitters, and other industrial asset in communication with communication network 120. In at least one implementation, an industrial device detected on communication network 120 by computing system 101 could be provided by a third party vendor or manufacturer. The industrial devices that may be automatically detected by computing system 101 could comprise any industrial asset or equipment that is in communication with communication network 120. In some examples, computing system 101 iteratively scans communication network 120 to automatically detect industrial devices based on network parameters such as IP address, media access control (MAC) address, or some other networking information. For example, the industrial devices that are discoverable by computing system 101 may comprise Ethernet devices having assigned IP addresses to enable communication over communication network 120. Therefore, in some implementations, computing system 101 could iteratively scan through a range of IP addresses on communication network 120 to automatically detect the industrial devices. In at least one implementation, computing system 101 could iteratively scan communication network 120 to automatically detect industrial devices by sequentially pinging a range of IP addresses on communication network 120. For example, computing system 101 could iterate through a series of IP addresses on communication network 120 by transmitting a ping command to the IP addresses and record which IP addresses respond to the ping command in order to automatically detect industrial devices on communication network 120. Other techniques of iteratively scanning communication network 120 to automatically detect at least one industrial device on communication network 120 are possible within the scope of this disclosure.

Computing system 101 determines a unique identifier of a device type associated with the at least one industrial device detected on communication network 120 (202). In some examples, computing system 101 could determine a unique identifier of a device type associated with an industrial device detected on communication network 120 in order to help identify what type of equipment was detected and how to establish communication. In at least one implementation, the unique identifier is associated with the device type of an industrial device detected on communication network 120. In some implementations, the device type associated with an industrial device could be defined as a manufacturer or vendor and model of the device. Accordingly, in at least one implementation, computing system 101 could determine a unique identifier of a device type associated with an industrial device detected on communication network 120 by assigning a unique identifier to a detected device that identifies a vendor and model of the equipment. Other techniques of determining a unique identifier of a device type associated with an industrial device detected on communication network 120 are possible and within the scope of this disclosure.

Computing system 101 determines an identity object for the at least one industrial device and maps the identity object to the unique identifier of the device type associated with the at least one industrial device (203). Generally, an identity object for an industrial device functions to identify the device and define its capabilities. For example, the identity object may identify device capabilities such as device parameters, communication protocols, and other properties of an industrial device. In some implementations, identity objects for known or previously identified industrial devices may be stored in database system 140 and retrieved based on the unique identifier or some other identifying information associated with the detected device. However, in at least one implementation, computing system 101 could determine an identity object for an industrial device by creating a proxy identity object for the industrial device. For example, for an unknown industrial device detected on communication network 120, computing system 101 could generate a proxy identity object for that device and slowly define the proxy identity object over time as more parameters and other capabilities of the device are observed or determined. In some implementations, computing system 310 could log sequential data streams received from the discovered device and subsequently analyze the streams to identify a device type or determine a proxy identity object for the unknown device. Further, in at least one implementation, computing system 101 could utilize predefined template identity objects for broader categories of industrial devices that define general capabilities of devices according to their device type, and could determine an identity object for a detected device by creating a proxy identity object for the device based on a template identity object that corresponds to the unique identifier of the device type associated with the detected device.

Once the identity object for a detected industrial device is determined, computing system 101 maps the identity object to the unique identifier of the device type associated with the detected device. For example, computing system 101 could map the identity object for an industrial device to the unique identifier of the device type associated with the device in order to establish and maintain a relationship between the identity of the device and its device type, which can be useful for subsequent data organization, categorization, and contextualization. In at least one implementation, computing system 101 could map the identity object of a detected device to its associated device type identified by the unique identifier associated with the industrial device in order to create device hierarchies and relationships among similar types of devices. Further, computing system 101 could also map the identity object of a device to more general industrial application categories associated with the device, such as controllers, drives, motors, compressors, pumps, sensors, transmitters, networking devices, power equipment, and any other categorization.

Based on the identity object for the at least one industrial device, computing system 101 establishes communication with the at least one industrial device on communication network 120 and receives operational data from the at least one industrial device (204). Generally, computing system 101 utilizes the identity object for the industrial device to determine how to establish communication with the device. In some examples, an identity object for an industrial device could define the communication protocols, device parameters, and other properties of the device, and computing system 101 could utilize this information from the identity object to establish communication with the device. For example, in at least one implementation, computing system 101 could establish communication with an industrial device on communication network 120 by communicating with the industrial device using a communication protocol identified in the identity object for the industrial device. Some examples of communication protocols that may be supported by industrial devices include session initiation protocol (SIP), common industrial protocol (CIP), process field bus (PROFIBUS), Modbus, or any other communication format. Further, in some implementations, computing system 101 may establish communication with an industrial device on communication network 120 by communicating with the industrial device using a common gateway platform (CGP). In this case, the CGP could be configured with additional connectors or adapters that enable communication with third party devices provided by various different manufacturers.

Once communication with a detected industrial device is established, computing system 101 may receive operational data from the device over communication network 120. Generally, the operational data received from the industrial device could comprise any device parameters, process variables, status metrics, operational settings, performance values, sensor data, set points, proportional integral derivative (PID) offsets, or any other operational data associated with an industrial automation device. In some examples, the operational data could comprise motor speeds, conveyor belt drive rates, revolutions, pressures, tank levels, agitation rates, air injection rates, flow rates, vibration indicators, valve tolerances, performance curves, and any other operational data. The operational data could also include standard tag definitions in some implementations, which may include rates, temperatures, odometers, counts, maintenance events, information identifiers, and any other defined tag values. Further, in at least one implementation, computing system 101 could receive the operational data from an industrial device by identifying parameters from the identity object for the industrial device and querying the parameters to receive the operational data from the industrial device. For example, the identity object for a device may define parameters associated with the device that may be queried, and computing system 101 could process the identity object to identify the parameters and responsively query the parameters from the device to receive the operational data. Other techniques of receiving operational data from an industrial device are possible and within the scope of this disclosure.

Computing system 101 processes the operational data received from the at least one industrial device to generate a device profile for the at least one industrial device (205). For example, computing system 101 may create a device profile for a detected device in database system 140 and store the operational data received from the device in the device profile for the industrial device. In some examples, the device profile would be persisted within a relational database such as database system 140 using the unique identifier or identity object associated with the industrial device. Accordingly, the operational data stored in the device profile is then made available for subsequent data searches, diagnostics, maintenance, analytics, and other data processing.

In order to help facilitate the data searches, analytics, and other operations on the data, computing system 101 may categorize the operational data in the device profile. For example, in some implementations, computing system 101 could categorize the operational data in the device profile by vendor or manufacturer, model, device or equipment type, industrial application, and any other categorization. Further, in at least one implementation, computing system 101 could categorize the operational data in the device profile based on the unique identifier of the device type associated with industrial device. In addition to categorization, in some implementations computing system 101 may also contextualize the operational data in the device profile for a detected device. For example, computing system 101 could contextualize the operational data in the device profile by matching the device profile with associated contextual data from other data sources, such as relational databases, historians, application programming interfaces (APIs), power data from intelligent electronic devices (IEDs) and smart meters, and any other contextual data sources. In some implementations, in order to contextualize the operational data, computing system 101 could match the device profile with associated contextual data from other data sources by mapping the operational data in the device profile to the associated contextual data based on data categorizations of the operational data, such as a unique identifier, device or equipment type, identity object, industrial application, or any other data categorizations. Accordingly, once the operational data is built into a device profile for a device and categorized and contextualized, the data may then be more readily utilized for subsequent data searches, diagnostics, maintenance, analytics, contextual data requests from other applications, and other data processing using real-time data from the device.

Advantageously, computing system 101 automatically detects industrial devices on communication network 120, determines identity objects for the detected devices, and establishes communication to receive operational data from the devices. Additionally, by utilizing standard electrical, mechanical, and ideal system characteristic curves depending on the application, computing system 101 is able to automatically generate predefined key performance indicators (KPIs), faceplates, reports, HMI content, historian templates, real-time trends, diagnostics, maintenance events and service interval recommendations, and other data analytics to provide out-of-the-box functionality for any devices discovered on communication network 120. In this manner, computing system 101 functions to provide improved and standardized integration of industrial devices and other distributed industrial automation assets and equipment into a common industrial automation platform. An exemplary implementation of another industrial automation environment that may utilize the above techniques to automatically discover industrial devices and receive associated data will now be discussed with respect to FIG. 3.

FIG. 3 is a block diagram that illustrates industrial automation environment 300 in an exemplary implementation. The techniques described below with respect to FIG. 3 could be executed by the systems of industrial automation mining environment 100 such as computing system 101 and industrial controller 130, and could be combined with operation 200 of FIG. 2 in some implementations. Industrial automation environment 300 provides an example of an industrial automation environment that may be utilized to implement the device discovery processes disclosed herein, but other environments could also be used. Industrial automation environment 300 includes user workstation 301, database 302, external networks 305, firewall 306, computing system 310, industrial plant network 320, equipment 330 and 340, relational databases 350, and device files 360. Computing system 310 provides an example of computing system 101 and internal plant network 320 provides an example of communication network 120, although computing system 101 and network 120 could use alternative configurations. Computing system 310 includes software modules 311-315. Specifically, computing system 310 comprises discovery agent 311, categorization agent 312, device profiles 313, contextualization agent 314, and search component 315. Equipment 330 includes industrial devices 331 and industrial controllers 332. Equipment 340 includes industrial devices 341 and 343, and industrial controllers 342 and 344.

In some examples, industrial automation environment 300 comprises an industrial mining operation, automobile manufacturing factory, food processing plant, oil drilling operation, microprocessor fabrication facility, or some other type of industrial enterprise. Industrial devices 331, 341, and 343 could comprise drives, pumps, filters, drills, motors, compressors, robots, mills, printers, sensors, transmitters, fabrication machinery, or any other industrial automation equipment. Industrial controllers 332, 342, and 344 comprise control systems, which could include automation controllers, programmable logic controllers (PLCs), programmable automation controllers (PACs), or any other controllers used in automation control. Industrial devices 331, 341, and 343 continually produce operational data over time. In some examples, the operational data may indicate the current status of industrial devices 331, 341, and 343, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. In some implementations, the operational data could also comprise dynamic charts or trends, real-time video, or some other graphical content.

In operation, control logic program code may be processed by industrial controllers 332, 342, and 344 in order to transmit control signals to their respective industrial devices 331, 341, and 343. The control instructions transmitted by industrial controllers 332, 342, and 344 direct industrial devices 331, 341, and 343 to update drive parameters, turn on a pump, speed-up a motor, extend a robotic arm, or perform some other action. In this example, industrial automation equipment 330 and 340 are connected over internal plant communication network 320 and communicate using various communication protocols, such as SIP, CIP, Modbus, and others. The control signals that direct the operation of various machines and devices 331, 341, and 343 are commonly transmitted by their respective industrial controllers 332, 342, and 344 to the machines and devices 331, 341, and 343 over internal plant network 320 using a communication protocol. The machines and other devices 331, 341, and 343 may also provide operational status data and other information back to industrial controllers 332, 342, and 344 or an HMI system over communication network 320. However, there are many different communication protocols supported by industrial devices employed in industrial automation environments, and many devices do not support the same protocols. In this example, industrial automation devices 331 and associated controllers 332 of equipment 330 are produced by a different vendor and communicate using a different communication protocol than industrial automation devices 341 and 343 and their associated controllers 342 and 344 of equipment 340. Because they are provided by different vendors and communicate using different protocols, the applications and systems associated with equipment 330 are limited to only working with devices 331 and associated controllers 332 of equipment 330, and are unaware of even the existence of additional devices 341 and 343 provided by other third party vendors of equipment 340, let alone capable of communicating with them and exchanging data. Beneficially, the techniques disclosed herein provide for the ability to automatically discover third party industrial devices 341 and 343, standardize data models, and contextualize data to provide out-of-the-box, application-specific functionality for industrial automation systems that involve multiple different vendor devices in an industrial automation environment. An exemplary operation involving industrial automation environment 300 that provides for automatically discovering third party industrial equipment 340 and receiving associated data will now be discussed with respect to FIG. 4.

FIG. 4 is a flow diagram that illustrates an operation 400 of a computing system in an exemplary implementation. The steps of the operation are indicated below parenthetically. The techniques described below with respect to FIG. 4 could be executed by the systems of industrial automation mining environment 100 such as computing system 101 and industrial controller 130, and could be combined with operation 200 of FIG. 2 in some implementations.

The following discussion of operation 400 will proceed with reference to computing system 310, internal plant network 320, and other elements of FIG. 3 in order to illustrate its operations, but note that the details provided in FIG. 3 are merely exemplary and not intended to limit the scope of process 400 to the specific implementation shown in FIG. 3. Operation 400 may be employed to operate computing system 310 to automatically discover third party industrial equipment 340 and receive associated data in industrial automation environment 300. As shown in the operational flow of process 400, computing system 310 iterates and identifies third party industrial devices 341 and 343 automatically within the plant (401). In this example, computing system 310 executes discovery agent 311 to systematically iterate through a range of IP addresses by pinging the IP addresses and noting which IP addresses return a ping response in order to identify industrial devices 341 and 343 automatically.

For each of the industrial devices 341 and 343 discovered, computing system 310 retrieves a unique identifier of each vendor and specific equipment type (402), such as a particular model of the equipment. Computing system 310 also retrieves identity objects of industrial devices 341 and 343 and maps the identity objects to the unique identifiers (403). In some implementations, unique identifiers for known device types may be stored in database 302 and retrieved based on the device type of the detected devices 341 and 343. Likewise, identity objects for known or previously identified industrial devices may also be stored in database 302 and retrieved based on the unique identifier or some other identifying information associated with the detected devices. However, in at least one implementation, computing system 310 could determine an identity object for an unknown industrial device by creating a proxy identity object for the industrial device. For example, for an unknown third party industrial devices 341 and 343 detected on network 320, computing system 101 could generate proxy identity objects for those devices and slowly build and define the proxy identity objects over time as more parameters and other capabilities of the devices 341 and 343 are observed or determined. In some implementations, computing system 310 could automatically determine any of the unique identifiers, device types, or identity objects for unknown third party industrial devices 341 and 343 detected on network 320 through a systematic trial-and-error iterative process. For example, computing system 310 could attempt to submit various commands to the IP addresses discovered for unknown devices 341 and 343 and monitor for expected responses. In some examples, computing system 310 could utilize artificial intelligence and machine learning techniques to make educated guesses about the identities of devices 341 and 343 and continue to further refine the selection of commands and protocols to try submitting to devices 341 and 343 based on the observed responses and any other available information about the detected devices 341 and 343. For example, if the IP addresses of devices 341 and 343 are within a particular range or threshold proximity to other IP addresses of known device types, computing system 310 could predict that devices 341 and 343 are likely of a similar device type as the known devices that have IP addresses within close range of the unknown devices 341 and 343. Computing system 310 could then select test commands to send to the unknown devices 341 and 343 based on identity objects of the known devices having proximate IP addresses and monitor for expected responses to the commands in order to positively identify the unknown devices 341 and 343 and generate corresponding proxy identity objects for devices 341 and 343. Additionally or alternatively, in some implementations, computing system 310 could log sequential data streams received from the unknown devices 341 and 343 and subsequently analyze the streams to identify a device type or determine a proxy identity object for the unknown devices 341 and 343.

Once the identity objects for the detected devices 341 and 343 is determined, computing system 310 maps the identity object to the unique identifiers assigned to the devices. In some examples, computing system 310 could map the identity object for devices 341 and 343 to their respective unique identifiers in order to establish and maintain relationships between the identities of the devices 341 and 343 and their associated vendor and specific equipment types, which can be useful for subsequent data organization, categorization, and contextualization.

Computing system 310 queries parameters from the identity objects of devices 341 and 343 and constructs device profiles (404). In this example, computing system 310 executes device profiles agent 313 to query desired parameters from the devices 341 and 343 and create the device profiles. For example, the identity objects may define parameters associated with their respective devices 341 and 343 that may be queried by computing system 310, and computing system 310 could process the identity objects to identify the desired parameters of devices 341 and 343 and responsively query the parameters from the devices 341 and 343. Computing system 310 could then construct the device profiles for devices 341 and 343 using the parameters returned from querying devices 341 and 343.

Computing system 310 then ensures persistence of the device data by storing the device profiles in relational database 302 for historical access (405). The device parameters and other data stored in the device profiles is thereby made available for subsequent data searches, diagnostics, maintenance, analytics, and other data processing by computing system 310 and/or user workstation 301. In order to help facilitate the data searches conducted by computing system 310 using search component 315, computing system 310 may categorize the operational data in the device profile using categorization agent 312. For example, in some implementations, computing system 310 could execute the categorization agent 312 to categorize the device parameters and other operational data in the device profile by vendor, model, device or equipment type, industrial application, and any other categorization. Accordingly, these categorizations can help enable search component 315, when executed by computing system 310, to search through the data and the data profiles by vendor, model, device type, industrial application, and others.

In addition to categorization, computing system 310 may also contextualize the device parameters stored in the device profile for a detected device. For example, computing system 101 could execute contextualization agent 314 to determine contextual data from relational databases 350, APIs, and other industrial devices (406). In some implementations, computing system 310 could utilize contextualization agent 314 to contextualize the parameters and other data in the device profile by matching the device profile with associated contextual data from other data sources, such as data stored in relational databases 350, data historians, APIs, other industrial devices, power data from intelligent electronic devices (IEDs) and smart meters, and any other contextual data sources. Once the parameters and other data in the device profile for a device is categorized and contextualized, the data may be more readily utilized for subsequent data searches, diagnostics, maintenance, analytics, contextual data requests from other applications, and other data processing using real-time data from the device. In this manner, computing system 310 is able to provide out-of-the-box application specific information and analytics (407), including automatically generating predefined KPIs, faceplates, reports, real-time trends, diagnostics, maintenance, and other data analytics to provide this out-of-the-box functionality for any devices 341 and 343 discovered on the network 320.

Now referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, cellular networks, wireless mesh networks (WMN), local area networks (LAN), metropolitan area networks (MAN), wide area networks (WAN), or other network topologies, equipment, or systems, including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Industrial controller 130 generally comprises a processing system and communication transceiver. Industrial controller 130 may reside in a single device or may be distributed across multiple devices. Industrial controller 130 may be a discrete system or may be integrated within other systems, including other systems within industrial automation environment 100 or an automation control system. In some examples, industrial controller 130 could comprise automation controllers, programmable logic controllers (PLCs), programmable automation controllers (PACs), or any other controllers used in automation control. In some implementations, a PLC, PAC, and/or specific modules within a PLC rack could provide some or all of the functionality described herein for industrial controller 130. In some examples, industrial controller 130 could comprise a ControlLogix® control system provided by Rockwell Automation, Inc.

Database system 140 may comprise any computer-readable storage media capable of storing data. Database system 140 may include volatile and nonvolatile, removable and non-removable media implemented in any method or technology for storage of information, such as computer readable instructions, data structures, program modules, or other data. Database system 140 may be implemented as a single storage device but may also be implemented across multiple storage devices or sub-systems co-located or distributed relative to each other. In some implementations, database system 140 may comprise a processing system or some other type of processing circuitry. Database system 140 may comprise additional elements, such as a controller, capable of communicating with a processing system. In some examples, database system 140 could comprise random-access memory, read-only memory, magnetic disks, optical disks, integrated circuits, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media.

Communication links 121-124 use metal, air, space, optical fiber such as glass or plastic, or some other material as the transport medium, including combinations thereof. Communication links 121-124 could use various communication protocols, such as TDM, IP, Ethernet, telephony, cellular, optical networking, hybrid fiber coax (HFC), communication signaling, wireless protocols, or some other communication format, including combinations thereof. Communication links 121-124 could be direct links or may include intermediate networks, systems, or devices.

Turning now to FIG. 5, a block diagram that illustrates an industrial automation environment 500 in an exemplary implementation is shown. Industrial automation environment 500 provides an example of an industrial automation environment that may be utilized to implement the device discovery processes disclosed herein, but other environments could also be used. Industrial automation environment 500 includes computing system 510, machine system 520, industrial controller 525, database system 530, and application integration platform 535. Computing system 510 provides an example of computing systems 101 and 310, although systems 101 and 310 could use alternative configurations. Industrial controller 525 provides an example of industrial controller 130, although controller 130 could use alternative configurations. Machine system 520 and controller 525 are in communication over a communication link, controller 525 and database system 530 communicate over a communication link, database system 530 and application integration platform 535 communicate over a communication link, and application integration platform 535 and computing system 510 are in communication over a communication link. Note that there would typically be many more machine systems in most industrial automation environments, but the number of machine systems shown in FIG. 5 has been restricted for clarity.

Industrial automation environment 500 comprises an industrial mining operation, automobile manufacturing factory, food processing plant, oil drilling operation, microprocessor fabrication facility, or some other type of industrial enterprise. Machine system 520 could comprise a sensor, drive, pump, filter, drill, motor, robot, fabrication machinery, mill, printer, or any other industrial automation equipment, including their associated control systems. A control system comprises, for example, industrial controller 525, which could include automation controllers, programmable logic controllers (PLCs), programmable automation controllers (PACs), or any other controllers used in automation control. Additionally, machine system 520 could comprise other industrial equipment, such as a brew kettle in a brewery, a reserve of coal or other resources, or any other element that may reside in an industrial automation environment 500.

Machine system 520 continually produces operational data over time. The operational data indicates the current status of machine system 520, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 520 and/or controller 525 is capable of transferring the operational data over a communication link to database system 530, application integration platform 535, and computing system 510, typically via a communication network. Database system 530 could comprise a disk, tape, integrated circuit, server, or some other memory device. Database system 530 may reside in a single device or may be distributed among multiple memory devices.

Application integration platform 535 comprises a processing system and a communication transceiver. Application integration platform 535 may also include other components such as a router, server, data storage system, and power supply. Application integration platform 535 may reside in a single device or may be distributed across multiple devices. Application integration platform 535 may be a discrete system or may be integrated within other systems, including other systems within industrial automation environment 500. In some examples, application integration platform 535 could comprise a FactoryTalk® VantagePoint server system provided by Rockwell Automation, Inc.

The communication links over which data is exchanged between machine system 520, industrial controller 525, database system 530, application integration platform 535, and communication interface 508 of computing system 510 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, cellular networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 510 may be representative of any computing apparatus, system, or systems on which the device discovery processes disclosed herein or variations thereof may be suitably implemented. Computing system 510 provides an example of a computing system that could be used as a either a server or a client device in some implementations, although such devices could have alternative configurations. Examples of computing system 510 include mobile computing devices, such as cell phones, tablet computers, laptop computers, notebook computers, and gaming devices, as well as any other type of mobile computing devices and any combination or variation thereof. Examples of computing system 510 also include desktop computers, server computers, and virtual machines, as well as any other type of computing system, variation, or combination thereof. In some implementations, computing system 510 could comprise a mobile device capable of operating in a server-like fashion which, among other uses, could be utilized in a wireless mesh network.

Computing system 510 includes processing system 501, storage system 503, software 505, communication interface 508, and user interface 509. Processing system 501 is operatively coupled with storage system 503, communication interface 508, and user interface 509. Processing system 501 loads and executes software 505 from storage system 503. Software 505 includes application 506 and operating system 507. Application 506 may include device discovery process 200 in some examples. When executed by computing system 510 in general, and processing system 501 in particular, software 505 directs computing system 510 to operate as described herein for device discovery process 200 or variations thereof. In this example, user interface 509 includes display system 511, which itself may be part of a touch screen that also accepts user inputs via touches on its surface. Computing system 510 may optionally include additional devices, features, or functionality not discussed here for purposes of brevity.

Turning now to FIG. 6, a block diagram is shown that illustrates computing system 600 in an exemplary implementation. Computing system 600 provides an example of computing system 101, computing system 310, or any computing system that may be used to execute device discovery process 200 or variations thereof, although computing systems 101 and 310 could use alternative configurations. Computing system 600 includes processing system 601, storage system 603, software 605, communication interface 607, and user interface 609. User interface 609 comprises display system 608. Software 605 includes application 606 which itself includes device discovery process 200. Device discovery process 200 may optionally be implemented separately from application 606, as indicated by the dashed line in FIG. 6.

Computing system 600 may be representative of any computing apparatus, system, or systems on which application 606 and device discovery process 200 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for device discovery process 200 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 may load and execute portions of software 605, such as device discovery process 200, to render a graphical user interface for application 606 for display by display system 608 of user interface 609. Software 605 may be implemented in program instructions and among other functions may, when executed by computing system 600 in general or processing system 601 in particular, direct computing system 600 or processing system 601 to iteratively scan a communication network to automatically detect at least one industrial device on the communication network. Software 605 may further direct computing system 600 or processing system 601 to determine a unique identifier of a device type associated with the at least one industrial device detected on the communication network. In addition, software 605 directs computing system 600 or processing system 601 to determine an identity object for the at least one industrial device and map the identity object to the unique identifier of the device type associated with the at least one industrial device. Software 605 also directs computing system 600 or processing system 601 to, based on the identity object for the at least receive operational data from the at least one industrial device one industrial device, establish communication with the at least one industrial device on the communication network. Finally, software 605 directs computing system 600 or processing system 601 to process the operational data received from the at least one industrial device to generate a device profile for the at least one industrial device.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate automatic discovery of industrial assets and associated data in an industrial automation environment as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or device discovery process 200 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as display system 608, speakers, haptic devices, and other types of output devices may also be included in user interface 609. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer-readable medium having stored thereon instructions to facilitate automatic discovery of industrial assets and associated data in an industrial automation environment, wherein the instructions, in response to execution, cause a system comprising a processor to perform operations, the operations comprising:

iteratively scanning a communication network to automatically detect at least one industrial device on the communication network;

determining a unique identifier of a device type associated with the at least one industrial device detected on the communication network;

determining an identity object for the at least one industrial device and map the identity object to the unique identifier of the device type associated with the at least one industrial device;

based on the identity object for the at least one industrial device, establishing communication with the at least one industrial device on the communication network and receiving operational data from the at least one industrial device;

processing the operational data received from the at least one industrial device to generate a device profile for the at least one industrial device; and categorizing the operational data in the device profile based on the unique identifier of the device type associated with the at least one industrial device.

2. The non-transitory computer-readable medium of claim 1 wherein determining the identity object for the at least one industrial device comprises creating a proxy identity object for the at least one industrial device.

3. The non-transitory computer-readable medium of claim 1 wherein receiving the operational data from the at least one industrial device comprises identifying parameters from the identity object for the at least one industrial device and querying the parameters to receive the operational data from the at least one industrial device.

4. The non-transitory computer-readable medium of claim 1 further comprising contextualizing the operational data in the device profile by matching the device profile with associated contextual data from other data sources.

5. The non-transitory computer-readable medium of claim 1 wherein establishing communication with the at least one industrial device on the communication network comprises communicating with the at least one industrial device using a common gateway platform.

6. The non-transitory computer-readable medium of claim 1 wherein establishing communication with the at least one industrial device on the communication network comprises communicating with the at least one industrial device using a communication protocol identified in the identity object for the at least one industrial device.

7. A method for automatic discovery of industrial assets and associated data in an industrial automation environment, the method comprising:

iteratively scanning, by a system comprising a processor, a communication network to automatically detect at least one industrial device on the communication network;

determining, by the system, a unique identifier of a device type associated with the at least one industrial device detected on the communication network;

determining, by the system, an identity object for the at least one industrial device and mapping the identity object to the unique identifier of the device type associated with the at least one industrial device;

based on the identity object for the at least one industrial device, establishing, by the system, communication with the at least one industrial device on the communication network and receiving operational data from the at least one industrial device;

processing, by the system, the operational data received from the at least one industrial device to generate a device profile for the at least one industrial device; and categorizing, by the system, the operational data in the device profile based on the unique identifier of the device type associated with the at least one industrial device.

8. The method of claim 7 wherein determining the identity object for the at least one industrial device comprises creating a proxy identity object for the at least one industrial device.

9. The method of claim 7 wherein receiving the operational data from the at least one industrial device comprises identifying parameters from the identity object for the at least one industrial device and querying the parameters to receive the operational data from the at least one industrial device.

10. The method of claim 7 further comprising contextualizing the operational data in the device profile by matching the device profile with associated contextual data from other data sources.

11. The method of claim 7 wherein establishing communication with the at least one industrial device on the communication network comprises communicating with the at least one industrial device using a common gateway platform.

12. The method of claim 7 wherein establishing communication with the at least one industrial device on the communication network comprises communicating with the at least one industrial device using a communication protocol identified in the identity object for the at least one industrial device.

13. A system to facilitate automatic discovery of industrial assets and associated data in an industrial automation environment, the system comprising:

a memory that stores executable components; and a processor, operatively coupled to the memory, that executes the executable components, the executable components comprising program instructions stored on the memory that, when executed by the processor, direct the processor to at least:

iteratively scan a communication network to automatically detect at least one industrial device on the communication network;

determine a unique identifier of a device type associated with the at least one industrial device detected on the communication network;

determine an identity object for the at least one industrial device and map the identity object to the unique identifier of the device type associated with the at least one industrial device;

based on the identity object for the at least one industrial device, establish communication with the at least one industrial device on the communication network and receive operational data from the at least one industrial device;

process the operational data received from the at least one industrial device to generate a device profile for the at least one industrial device; and categorize the operational data in the device profile based on the unique identifier of the device type associated with the at least one industrial device.

14. The system of claim 13 wherein the program instructions direct the processor to determine the identity object for the at least one industrial device by directing the processor to create a proxy identity object for the at least one industrial device.

15. The system of claim 13 wherein the program instructions direct the processor to receive the operational data from the at least one industrial device by directing the processor to identify parameters from the identity object for the at least one industrial device and query the parameters to receive the operational data from the at least one industrial device.

16. The system of claim 13 wherein the program instructions direct the processor to contextualize the operational data in the device profile by matching the device profile with associated contextual data from other data sources.

17. The system of claim 13 wherein the program instructions direct the processor to establish communication with the at least one industrial device on the communication network by directing the processor to communicate with the at least one industrial device using a common gateway platform.

* * * * *